(12) United States Patent
Peng et al.

(10) Patent No.: US 7,072,177 B2
(45) Date of Patent: Jul. 4, 2006

(54) MOUNTING MECHANISM FOR STORAGE DEVICE

(75) Inventors: Wen-Tang Peng, Tu-chen (TW); Chenglung Cheng, Shenzhen (CN); Shu-Gang Shi, Shenzhen (CN); Zhe Zhang, Shenzhen (CN)

(73) Assignees: Hong Fu Jin Precision Ind. (Shenzhen) Co., Ltd., Shenzhen (CN); Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/902,767

(22) Filed: Jul. 30, 2004

(65) Prior Publication Data

US 2005/0024819 A1    Feb. 3, 2005

(30) Foreign Application Priority Data

Jul. 30, 2003    (TW)    ................................... 92213895

(51) Int. Cl.
  *G06F 1/16*    (2006.01)
(52) U.S. Cl. ................... 361/685; 292/307 R; 248/551
(58) Field of Classification Search ........ 361/724–727, 361/679–687; 292/148, 151, 307 R; 248/551–553
See application file for complete search history.

(56) References Cited

U.S. PATENT DOCUMENTS

| 6,285,555 B1* | 9/2001 | O'Neal et al. .............. 361/727 |
| 6,469,900 B1* | 10/2002 | Cheng ......................... 361/726 |
| 2005/0007734 A1* | 1/2005 | Peng et al. ................. 361/685 |

FOREIGN PATENT DOCUMENTS

| TW | 525823 | 3/2003 |
| TW | 532497 | 5/2003 |

* cited by examiner

*Primary Examiner*—Hung Van Duong
(74) *Attorney, Agent, or Firm*—Wei Te Chung

(57) ABSTRACT

A mounting mechanism for storage device includes a tray (30) receiving a storage device (20) therein, a bracket (50) attached in the tray, and a chassis (2). An operating unit (10) pivotally attached to the bracket includes an actuator (60), a moveable member (90) and a fixing member (80) disposed in the actuator, and a spring (70) arranged between the moveable member and the actuator. The chassis includes a number of spacing plates (3) each defining a pair of apertures (4). The moveable member includes a pair of wedge-shaped extension tabs (922). The tray is secured in the chassis, with the extension tabs extending through the apertures the chassis. To detach the tray from the chassis, the operating unit is pivoted out and the moveable member is according rotated outward to withdraw its extension tabs from the apertures of the chassis.

15 Claims, 6 Drawing Sheets

MOUNTING MECHANISM FOR STORAGE DEVICE

BACKGROUND OF THE INVENTION

1. Field of the Invention

The present invention relates to mounting mechanisms for storage devices, and in particular to a mounting mechanism which can readily and conveniently removing and securing storage devices in a chassis. The invention relates to a contemporarily filed application titled "STORAGE DEVICE ASSEMBLY" with the same inventors and the same assignee as the invention.

2. Description of the Related Art

A typical personal computer invariably comprises one or more data storage devices for communication and handling of data. Such storage devices include, but are not limited to, hard disk drives, floppy disk drives and CD-ROM drives. Users of computers and technicians alike require that a drive bracket of an enclosure of the computer allows them to easily secure storage devices such as disk drives. Conventionally, each disk drive comprises a rigid casing that is retained in the enclosure by means of bolts or rivets. However, insertion and removal of screws is time consuming and cumbersome.

As computers have proliferated and improved, various devices have been developed to facilitate installation and removal of disk drives. One such device comprises two flat rectangular side pieces which are attached to opposite sides of the disk drive. Corresponding receiving rails provided in a drive bracket cooperatively receive the side pieces in sliding engagement. When the disk drive is fully received in the bracket, a screw is tightened so that the screw presses against one of the side pieces or the disk drive itself. However, this mounting system still needs using screws. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus an improved mounting mechanism for storage device which overcomes the above-mentioned drawbacks is desired.

SUMMARY OF THE INVENTION

Accordingly, an object of the present invention is to provide a mounting mechanism which can readily and conveniently removing and securing storage devices in a chassis.

To achieve the above-mentioned object, a mounting mechanism of present invention for storage devices includes a tray receiving a storage device therein, a bracket attached in the tray, and a chassis. An operating unit pivotally attached to the bracket includes an actuator, a moveable member and a fixing member disposed in the actuator, and a spring arranged between the moveable member and the actuator. The chassis includes a number of spacing plates each defining a pair of apertures. The moveable member includes a pair of wedge-shaped extension tabs. The tray is secured in the chassis, with the extension tabs extending through the apertures the chassis. To detach the tray from the chassis, the operating unit is pivoted out and the moveable member is according rotated outward to withdraw its extension tabs from the apertures of the chassis.

Other objects, advantages and novel features of the present invention will be drawn from the following detailed description of a preferred embodiment of the present invention with attached drawings, in which:

DETAILED DESCRIPTION OF THE INVENTION

Figure 1:
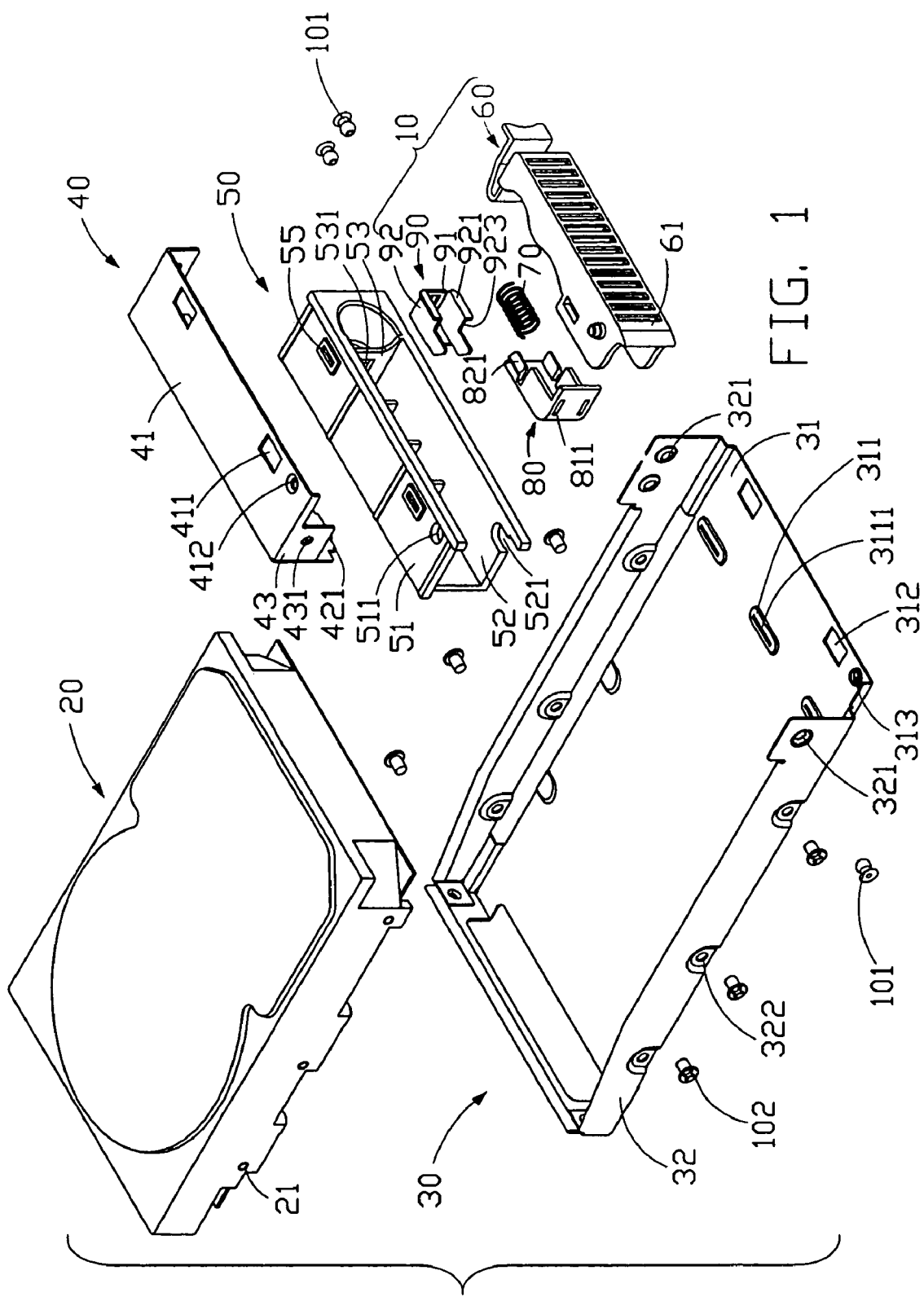
FIG. 1 is an exploded, isometric view of a mounting mechanism of the present invention for a storage device.
Figure 8:
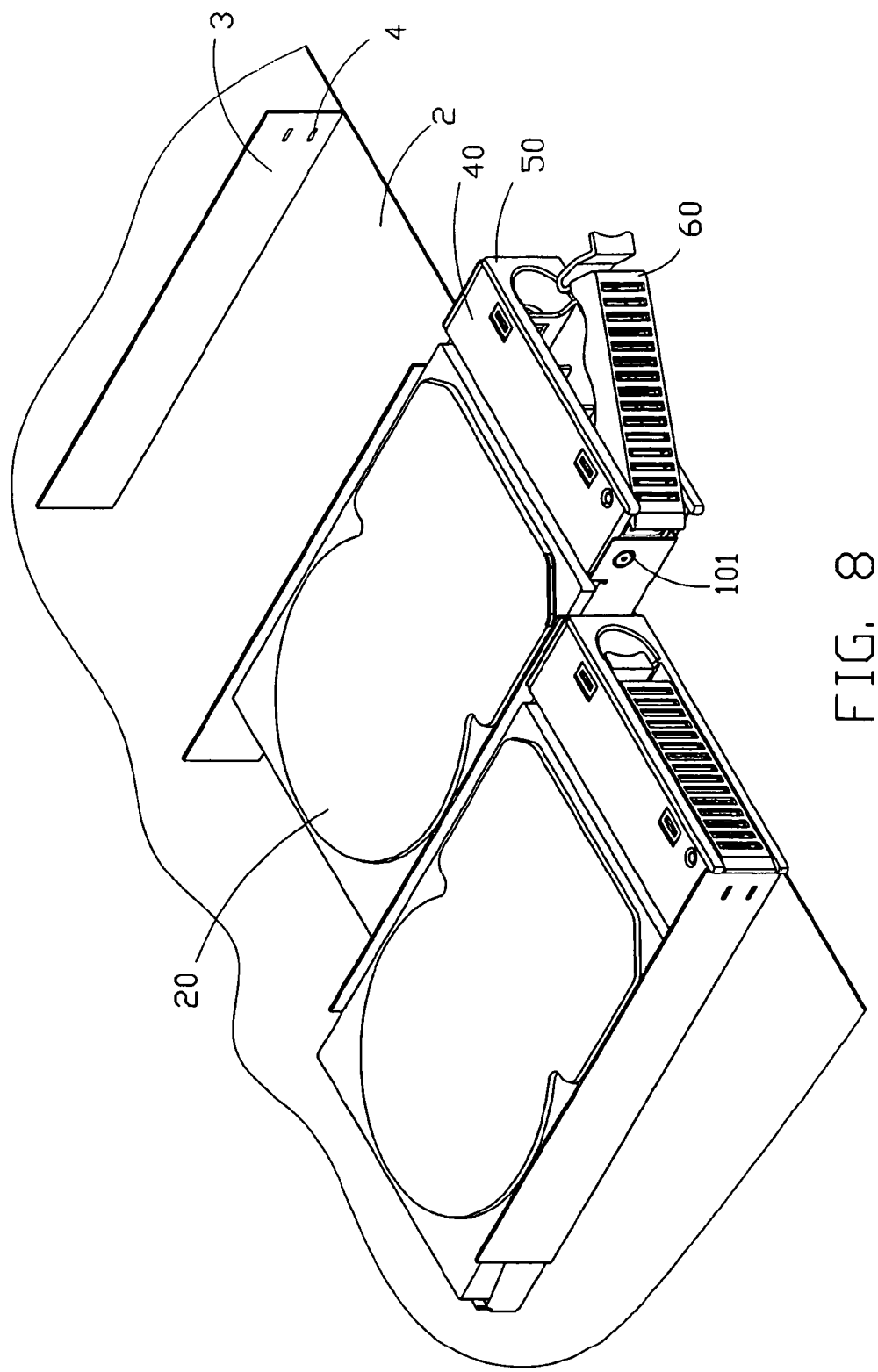
FIG. 8 is a fully assembled view of the FIG. 1 together with a chassis, and showing a plurality of storage device assemblies in different status.

Referring to FIGS. 1 and 8, a plurality of mounting mechanisms in accordance with the preferred embodiment of present invention is for mounting storage devices in a chassis 2 of an electronic device (not shown). The electronic device can be a server, or a computer, etc. Only one mounting mechanism is described hereafter. The mounting mechanism comprises a tray 30 for receiving a storage device 20, a bracket 50 disposed in the tray 30, a cover 40 and an operating unit 10 attached to the bracket 50. The operating unit 10 comprises an actuator 60, a spring 70, a fixing member 80, and a moveable member 90. The chassis 2 is used for slideably receiving the tray 30 containing the storage devices 20.

The storage device 20 defines a plurality of screw holes 21 in both sides thereof respectively.

The chassis 2 comprises a bottom (not labeled) and a plurality of parallel spacing plates 3 perpendicular to the bottom, cooperatively defining spaces for receiving trays 30. A pair of first apertures 4 is defined in a front portion of each spacing plate 3.

The tray 30 comprises a base 31 and a pair of parallel sidewalls 32 extending perpendicularly from opposite edges of the base 31. The sidewalls 32 and the base 31 corporately define a space for receiving the storage device 20 therein. A plurality of through holes 322 is defined in both sidewalls 12 respectively, corresponding to the screw holes 21 of the storage device 20. A through hole 321 is defined in a front portion of each sidewall 12. A plurality of protrusions 311 each defining a slit 3111 therein extrudes from a front of the base 31. A pair of slots 312 is defined in the base 31 in front of the protrusions 311. A pivot seat 313 defining a pivot hole (not labeled) therein extends at a front-left corner of the base 31.

The cover 40 is generally L-shaped. The cover 40 comprises a first plate 41 and a second plate 42 depending from a longitudinal edge of the first plate 41. A pair of slots 411 is defined in the first plate 41. A pivot hole 412 is defined at a left corner of the first plate 41, corresponding to the pivot seat 313 of the tray 30. A pair of vertical bars 43 depends from opposite latitudinal edges of the first plate 51. A pair of fixing holes 431 is defined in the bars 43, corresponding to the through holes 321 of the tray 30. A plurality of tips 421 extends from a bottom of the second plate 42, for engaging in the slits 3111 of the tray 30. A plurality of vents (see FIG. 6) is defined in the second plate 52 for facilitating ventilation to dissipate heat.

The bracket 50 comprises a top board 51, a bottom board 52, and a clapboard 53 disposed between the top board 51 and the bottom board 52. A pair of blocks 55 extrudes from each of the top panel 51 and the bottom panel 52, for separately engaging in the slots 411 of the cover 40 and slots 312 of the tray 30. A pivot bore 511 and a U-shaped cutout 521 are respectively defined at a left corner of the top board 51 and the bottom board 52, corresponding to the pivot hole 412 of the cover 40 and the pivot seat 313 of the tray 30. An opening 531 is defined in a middle of the clapboard 53.

Figure 2:
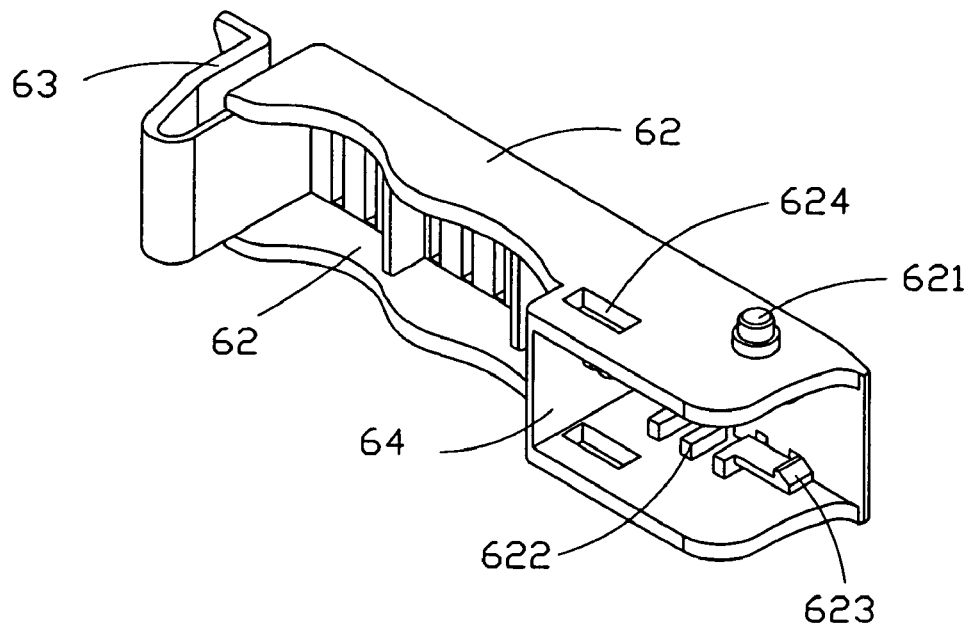
FIG. 2 is an enlarged, isometric views of an actuator of the mounting mechanism of FIG. 1, but viewed from another aspect.

Referring also to FIG. 2, the actuator 60 comprises a front panel 61, a pair of parallel side panels 62 extending perpendicularly and rearwardly from a top and a bottom edge of the front panel 61, and a vertical panel 64 arranged between the side panels 62. The side panels 62, the front panel 61, and the vertical panel 64 corporately define a space therebetween. A pair of collinear pivot rods 621 oppositely extrudes from a left outside portion of the side panels 62, for pivotally engaging in the pivot bore 511 and the cutout 521 of the bracket 50. A pair of gaps 624 is defined in the side panels 62 besides the pivot rod 621. A plurality of cubical supports 622 extrudes from insides of the side panels 62. A horizontal first post 641 (see FIG. 3) extends from the vertical panel 64 into said space. A resilient hook 623 extends leftwardly from a leftmost support 622 in the bottom side panel 62. A resilient handle 63 is formed at a right end of the actuator 60. A wedge 631 (see FIG. 3) extrudes outwardly from an outer face of the handle 63, for being engagingly received in the opening 531 of the clapboard 53 of the bracket 50.

Figure 3:
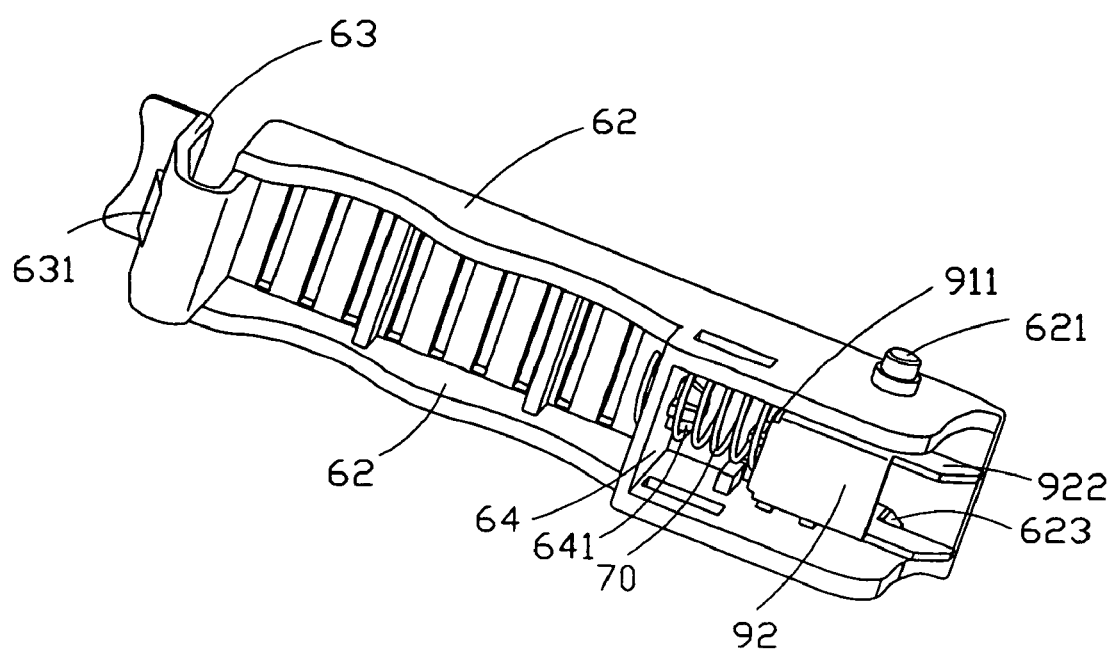
FIGS. 3–5 are sub-assembled views respectively showing a moveable member, a fixing member, and a bracket successively assembled to the actuator of FIG. 2.
Figure 4:
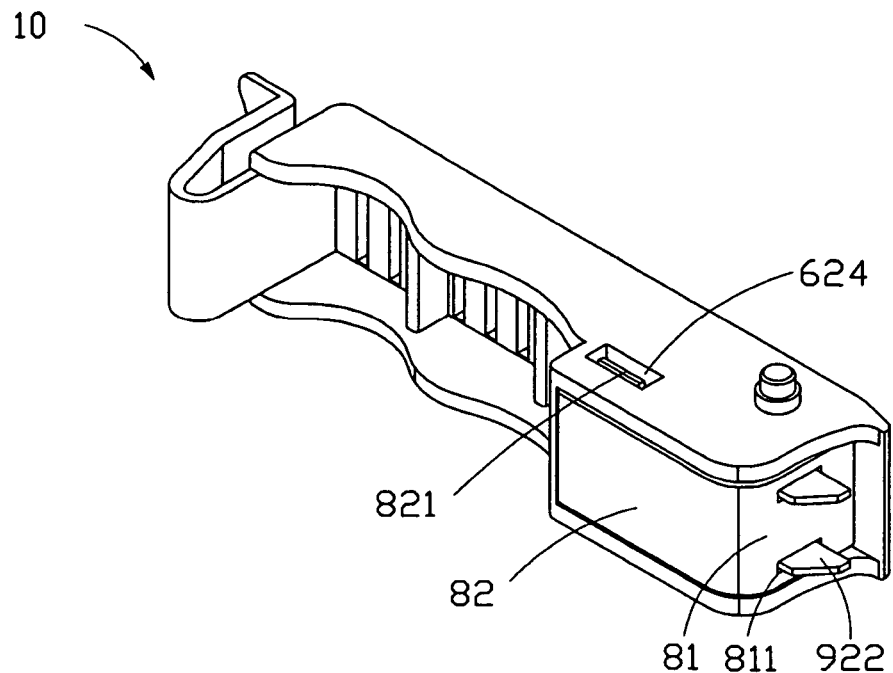

Referring also to FIGS. 3–4, the fixing member 80 comprises a left end wall 81 and a pair of sidewalls 82 extending from a top and a bottom edge of the end wall 81. A pair of second apertures 811 is defined in the left end wall 81. A pair of catches 821 is symmetrically formed in a right portion of the sidewalls 82, for engaging in the gaps 624 of the actuator 60.

The moveable member 90 comprises a right end wall 91 and a pair of sidewalls 92 extending from a top and a bottom edge of the end wall 91. A pair of flanges 921 extends perpendicularly in opposite directions from distal edges of the sidewalls 92 respectively, for engaging with inner surfaces of the supports 622 of the actuator 60. A wedge-shaped extension tab 922 is formed from a left end of each sidewall 92, for extending through the second apertures 811 of the fixing member 80 and the first apertures 4 of the chassis 2. A pair of shoulders 923 of the moveable member 90 is used for engaging with the hooks 623 of the actuator 60 to prevent disengagement of the moveable member 90 from the actuator 60. A second post 911 extrudes from the left end wall 91, corresponding to the first post 641 of the actuator 60 for elastically holding the spring 70 therebetween.

In assembly of the operating unit 10, the moveable member 90 is sandwiched between the supports 622 of the actuator 60. The flanges 921 abut against inner surfaces of the supports 622, and the hooks 623 engage with the shoulders 923. The spring 70 is elastically disposed between the second post 911 of the moveable member 90 and the first post 641 of the actuator 60. Then the fixing member 80 is attached to the actuator 60. The catches 821 of the fixing member 80 engage in the gaps 624 of the actuator 60, and the extension tabs 922 of the moveable member 922 extend through the second apertures 811.

Figure 5:
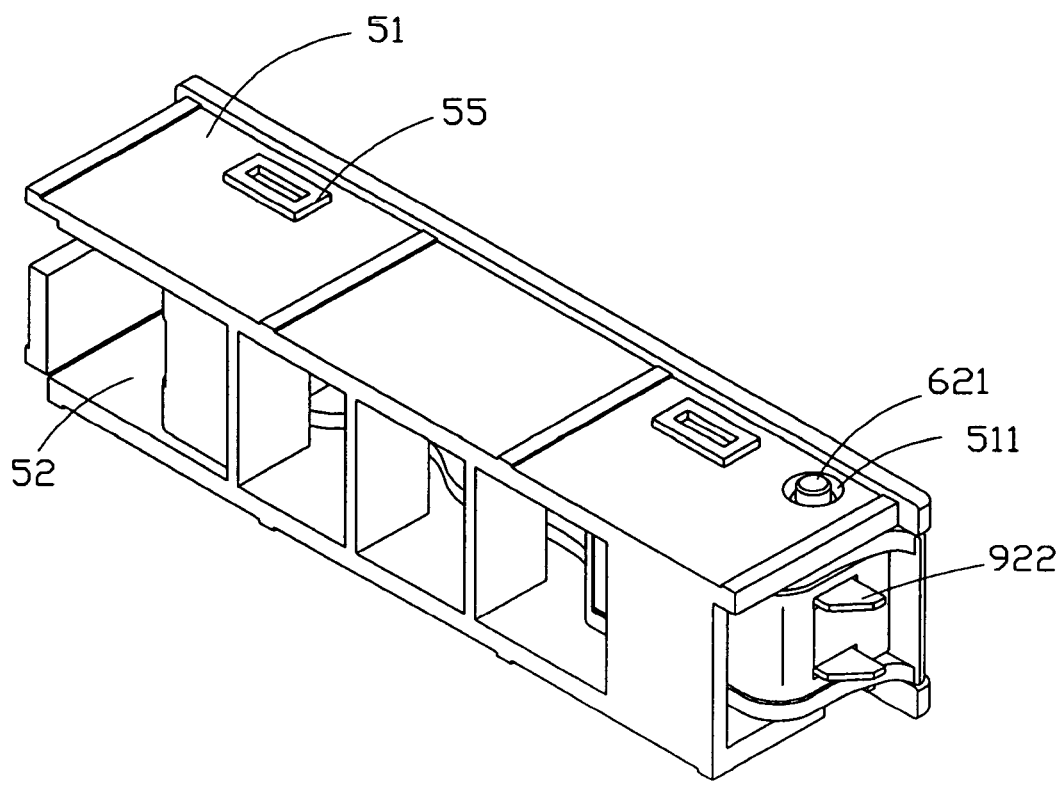
Figure 6:
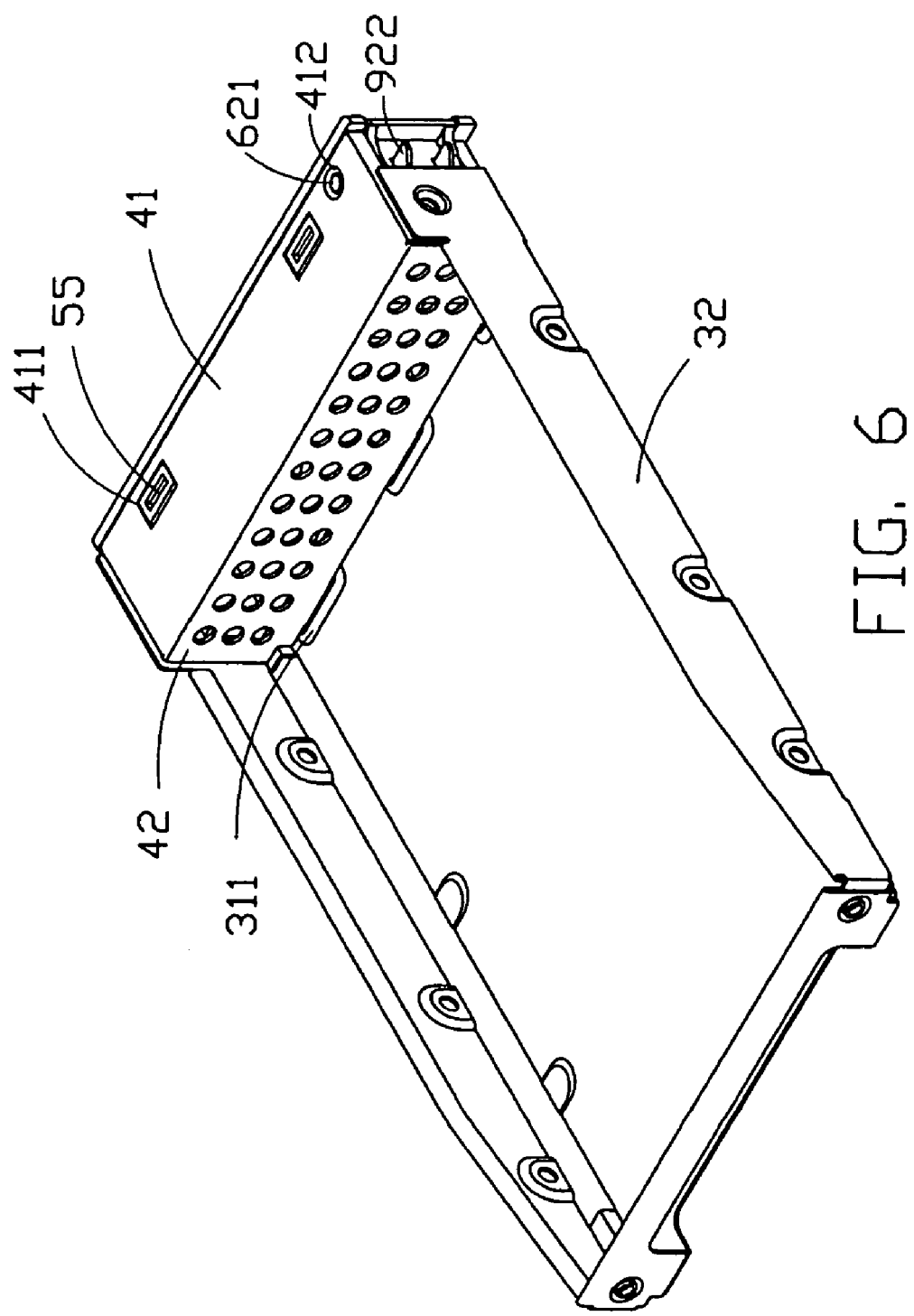
FIG. 6 is an assembled, isometric view of the mounting mechanism of FIG. 1, but a storage devices not installed.
Figure 7:
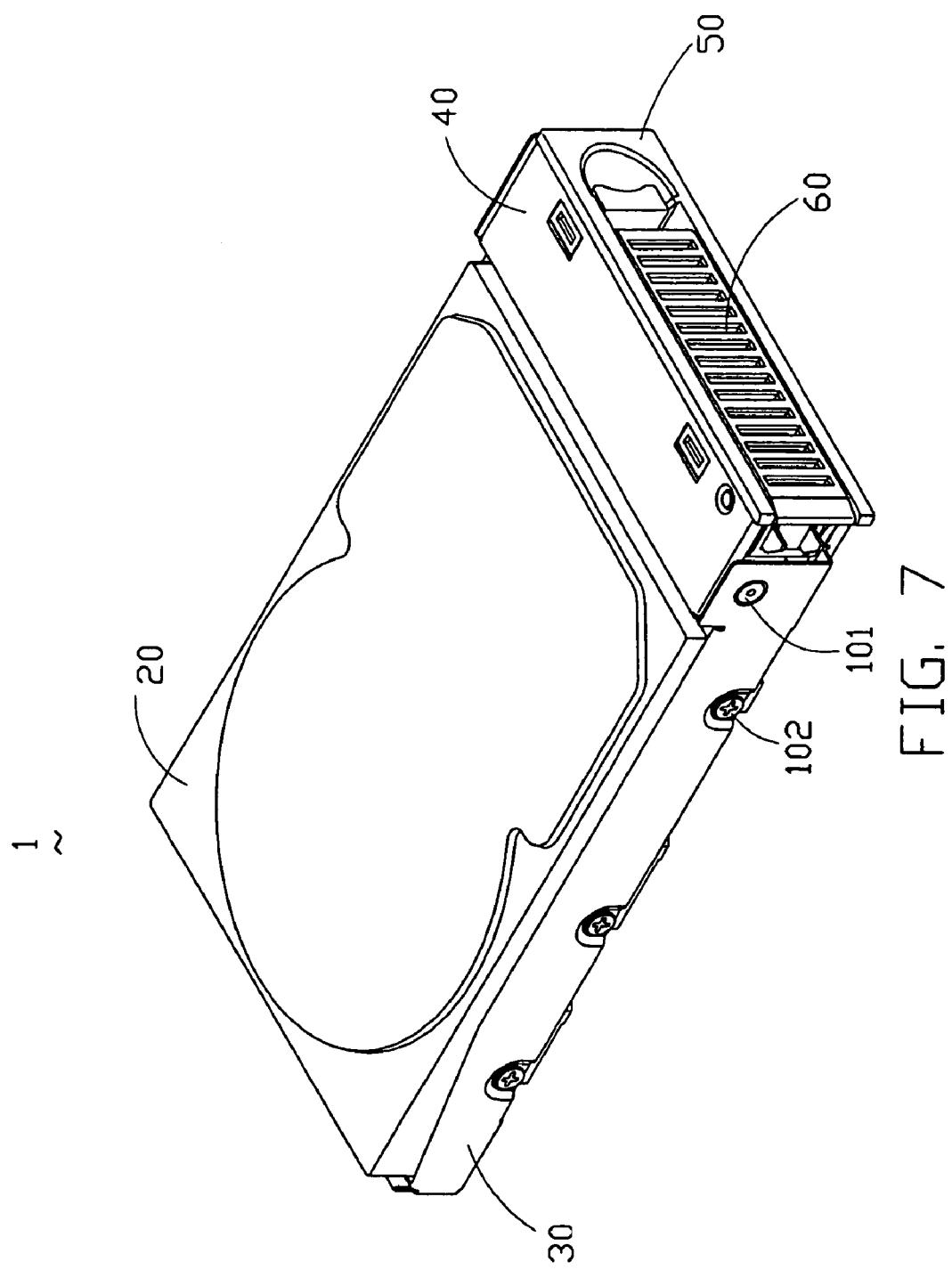
FIG. 7 is an assembled, isometric view of FIG. 1.

Referring also to FIGS. 5 to 7, the operating unit 10 is sandwiched in the bracket 50. The pivot rods 621 pivotally extend through the pivot bore 511 and the cutout 512 of the bracket 50. The wedge 631 protrudes into the opening 531 of the clapboard 53 of the bracket 50. The cover 40 is attached to the combined operating unit 10 and the bracket 50. An upper pivot rod 621 extends into the pivot hole 412 of the cover 40, and the blocks 55 of the top panel 51 of the bracket 50 are received in the slots 411 of the cover 40.

Then the combined cover 40, bracket 50, and the operating unit 10 are attached to tray 30. A lower pivot rod 621 engages in the pivot seat 313, and the blocks 55 of the bottom panel 52 of the bracket 50 are received in the slots 312 of the tray 30. The vertical bars 43 of the cover 40 abut against inner surfaces of the front portions of the sidewalls 32 of the tray 30. The tips 421 of the cover 40 engage in the slits 3111 of the tray 30. A pair of fasteners 101 extends through the through holes 321 of the tray 30 and the fixing hole 431 of the cover 40 to attach the cover 40 to the tray 30. The storage device 20 is disposed in the tray 30. A plurality of conventional screws 102 extends through the through holes 322 of the tray 30 and engages in the screw holes 21 of the storage device 20.

When the tray 30 slides into the chassis 2, the extension tabs 922 of the moveable member 90 are blocked by the spacing plates 3 and retract into the tray 30. The moveable member 90 is moved to slide toward the handle 63 of the actuator 60, with the spring 70 depressed. When the second apertures 811 of the fixing member 80 align with the first apertures 4 of the chassis 2, the extension tabs 922 extend into the apertures 4 via reversion force of the spring 70. The spring 70 rebounds and the moveable member 90 moves back to its original position. Thus the storage device 20 and the tray 30 are secured in the chassis 2.

In drawing the tray 30 out from the chassis 2, the resilient handle 63 of the actuator 60 is squeezed away from the clapboard 53 of the bracket 50 so that the wedge 631 is withdrawn from the opening 531 of the bracket 50. Then the operating unit 10 is rotated outwardly about the pivot rods 621, the extension tabs 922 of the moveable member 90 accordingly is rotated outwardly and withdrawn from the first apertures 4 of the chassis 2. The tray 10 is thus disengaged from the chassis 2 and easily drawn out therefrom.

It is to be understood, however, that even though numerous characteristics and advantages of the present invention have been set forth in the foregoing description, together with detail members of the structure and function of the invention, the disclosure is illustrative only, and changes may be made in detail member, especially in matters of shape, size, and arrangement of parts within the principles of the invention to full extent indicated by the broad general meaning of the terms in which the appended claims are expressed.

What is claimed is:

1. A mounting mechanism for a storage device comprising:
    a chassis comprising a bottom and a pair of spacing plates, one of the spacing plates defining an aperture therein;
    a tray received in the chassis between the spacing plates, the tray defining a space adapted to receive a storage device; and
    an operating unit pivotally attached to the tray, the operating unit comprising an actuator, a moveable member, and a resilient member, the moveable member moveably secured in the actuator, the resilient member disposed between the moveable member and the actuator, the moveable member comprising an extension tab corresponding to the first aperture of the chassis;

wherein when the tray together with the operating unit is moved in the chassis, the extension tab of the slider extends into the aperture of the spacing plates under the pressure of the resilient member, and wherein when the actuator is pivoted outwardly, the moveable member of the operating unit accordingly is pivoted outwardly so that the extension tab is rotated outwardly and withdrawn from the first aperture of the chassis, the tray is therefore drawn out from the chassis.

2. The mounting mechanism as described in claim 1, wherein the operating unit further comprises a fixing member attached to the actuator, for covering the moveable member.

3. The mounting mechanism as described in claim 1, wherein the actuator comprises a front panel, upper and lower side panels, and a vertical panel disposed between the side panels, a pair of collinear pivot rods formed from the side panels respectively.

4. The mounting mechanism as described in claim 2, wherein a pair of gaps is defined in the side panels of the actuator, the fixing member comprises a pair of catches engaging in the gaps.

5. The mounting mechanism as described in claim 3, wherein two posts extends toward each other respectively from the vertical panel and the moveable member, the resilient member is elastically disposed between the two posts.

6. The mounting mechanism as described in claim 3, wherein a resilient hook and a plurality of supports extends from inner surface of the side panels of the actuator for sandwiching the moveable member therebetween.

7. The mounting mechanism as described in claim 3, further comprising a bracket fixed in the tray.

8. The mounting mechanism as described in claim 7, wherein the actuator forms a resilient handle with a wedge at an opposite end, the bracket further comprises a clapboard defining an opening therein for receiving the wedges.

9. The mounting mechanism as described in claim 7, further comprising a cover attached to the bracket, wherein the cover comprises a first plate, a second plate depending from the first plate, and a pair of bars depending from opposite edges of the first plates, a pivot hole is defined in the first plate, corresponding to one of the pivot rods, the tray comprises a base wall and a pair of side walls, the base wall forms a pivot seat corresponding to the other pivot rod.

10. The mounting mechanism as described in claim 9, wherein a block forms on the bracket, the first plate of cover and the base wall of the tray respectively define a pair of slots for receiving corresponding blocks therein.

11. The mounting mechanism as described in claim 9, wherein the second plate of the cover forms a plurality of tips at a bottom edge therefrom, the base wall of the tray defines a plurality of slits for receiving the tips.

12. The mounting mechanism as described in claim 9, wherein a pair of fixing holes is defined in the bars of the cover, the side walls of the tray correspondingly defines a pair through holes therein, for engaging with a pair of fasteners.

13. A mounting mechanism assembly comprising:
a chassis comprising a pair of spacing plate, one of the spacing plates defining an aperture therein;
a storage device;
a tray received in the chassis between the spacing plates, the tray defining a space for receiving the storage device;
a bracket fixed in the tray, the bracket comprising a clapboard with an opening therein; and
an operating unit pivotally fixing in the bracket, the operating unit comprising an actuator, a moveable member, a fixing member and a spring, the moveable member movably sandwiched between the actuator and the fixing member fixed disposed in the actuator, the spring disposed between the moveable member and a vertical panel of the actuator, the moveable member comprising an extension tab corresponding to the aperture of the chassis;
wherein when the operating unit, the bracket and the tray are assembled in received between the spacing plates of the chassis with the extension tab of the moveable member extending into the aperture of the spacing plates under the pressure of the spring and the wedge of the actuator engaging in the opening of the bracket, and wherein when the operating unit is pivoted outwardly, the extension tab of the moveable member is accordingly rotated out from the apertures of the chassis, the tray is released and drawn out from the chassis.

14. A mounting mechanism assembly comprising:
a chassis comprising a pair of spacing plate, one of the spacing plates defining an aperture therein;
a storage device;
a tray received in the chassis between the spacing plates, the tray defining a space receiving the storage device therein;
a bracket fixed in the tray; and
an operating unit pivotally fixing to the bracket about a pivotal axis adjacent to said one of the spacing plates, the operating unit comprising:
an actuator and an associated moveable member moveable relative to the actuator along a lateral axis of the actuator perpendicular to said pivotal axis, a locking tab formed on the moveable member, a biasing device urging said moveable member outwardly away from the actuator; wherein
when assembled, the actuator is pivotally moved to an inner position relative to the bracket under a condition that the moveable member is urged by the biasing device with the locking tab extending into the aperture for locking the tray in position; when disassembled, the actuator is rotated to an outer position to have the associated moveable member rotated synchronically so as to allow the tray to be withdrawn from the chassis in a lengthwise direction perpendicular to said pivotal axis.

15. The assembly as claimed in claim 14, wherein for assembling, when the whole tray is located outside the chassis, the actuator can be first pivotally moved to the inner position, and the tray successively is forwardly moved to the chassis under a condition that the locking tab can be retreated inwardly in said lateral axis for allowing the tray to move forward without obstruction while still eventually locked in the aperture by said biasing device when said tray is moved to a final position.

* * * * *